United States Patent
Janjos et al.

(10) Patent No.: US 12,462,676 B2
(45) Date of Patent: Nov. 4, 2025

(54) MOVEMENT PREDICTION FOR ROAD USERS

(71) Applicant: Robert Bosch GmbH, Stuttgart (DE)

(72) Inventors: Faris Janjos, Stuttgart (DE); Maxim Dolgov, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 18/570,376

(22) PCT Filed: Jun. 1, 2022

(86) PCT No.: PCT/EP2022/064936
§ 371 (c)(1),
(2) Date: Feb. 2, 2024

(87) PCT Pub. No.: WO2022/263175
PCT Pub. Date: Dec. 22, 2022

(65) Prior Publication Data
US 2024/0282190 A1 Aug. 22, 2024

(30) Foreign Application Priority Data
Jun. 14, 2021 (DE) .................. 10 2021 206 014.5

(51) Int. Cl.
*G06V 10/82* (2022.01)
*G06V 20/58* (2022.01)
*G08G 1/01* (2006.01)

(52) U.S. Cl.
CPC .......... *G08G 1/0125* (2013.01); *G06V 10/82* (2022.01); *G06V 20/58* (2022.01); *G08G 1/0112* (2013.01); *G08G 1/0145* (2013.01)

(58) Field of Classification Search
CPC .. G08G 1/0125; G08G 1/0112; G08G 1/0145; G06V 20/58; G06V 10/82
See application file for complete search history.

(56) References Cited

U.S. PATENT DOCUMENTS

| | | |
|---|---|---|
| 2019/0088135 A1 | 3/2019 | Do et al. |
| 2020/0324794 A1 | 10/2020 | Ma et al. |
| 2021/0150228 A1 | 5/2021 | Goforth et al. |

FOREIGN PATENT DOCUMENTS

DE    10 2018 210 280 A1    1/2020

OTHER PUBLICATIONS

International Search Report corresponding to PCT Application No. PCT/EP2022/064936, mailed Sep. 16, 2022 (German and English language document) (6 pages).

*Primary Examiner* — Mathew Franklin Gordon
(74) *Attorney, Agent, or Firm* — Maginot, Moore & Beck LLP

(57) ABSTRACT

A method is for predicting movement of at least one traffic-related object based on observations of the surroundings of the object. The method includes mapping an observation of the surroundings at a first time by a trained encoder network to a representation with reduced dimensionality. The method also includes, based on a first action performed by the object at the first time and the representation, using at least one trained prediction network to determine a first representation prediction of the representation to which a future observation is likely to be mapped by the trained encoder network at a first future time, and/or determine a first action prediction of a second action that the object is likely to perform at the first future time. The method also includes determining a first dynamic state prediction for a dynamic state of the object at the first future time.

18 Claims, 2 Drawing Sheets

MOVEMENT PREDICTION FOR ROAD USERS

This application is a 35 U.S.C. § 371 National Stage Application of PCT/EP2022/064936, filed on Jun. 1, 2022, which claims the benefit of priority to Serial No. DE 10 2021 206 014.5, filed on Jun. 14, 2021 in Germany, the disclosures of which are incorporated herein by reference in their entirety.

The disclosure relates to the prediction of the movement of a vehicle on the basis of observations of the surroundings of this vehicle.

BACKGROUND

Vehicles that are at least partially automated in road traffic will not suddenly replace human-driven vehicles, nor will they be isolated from human-driven traffic on separate routes. Rather, these vehicles will have to move safely in mixed traffic with human-controlled third-party objects, wherein these third-party objects also comprise pedestrians or cyclists as weaker road users. With human-controlled foreign objects, there is always uncertainty as to which movement action these foreign objects will perform next. A control system for at least partially automated driving is therefore dependent on at least partially deducing the future behavior of foreign objects from the observation of previous behavior.

DE 10 2018 210 280 A1 describes a method for predicting the trajectories of foreign objects in the surroundings of an ego vehicle. This prediction is based on a determination of the near target to which the movement of each of the foreign objects leads and the basic rules according to which this movement takes place.

SUMMARY

In the context of the disclosure, a method was developed for predicting the movement of at least one traffic-relevant object on the basis of observations of the surroundings of this object.

A traffic-relevant object is any moving object whose movement may make it necessary for at least one other road user to change their behavior. In particular, these can be objects whose trajectory could intersect a planned or currently tracked trajectory of the other road user, such as an ego vehicle. This can, for example, cause the other road user to change their own trajectory in order to avoid a collision with the object.

Traffic-relevant objects can be, for example, motor vehicles or non-motorized vehicles such as bicycles or soapboxes. Pedestrians and animals are also traffic-relevant objects. However, an object does not necessarily have to be human, animal or automatically controlled in order to be relevant to traffic. For example, a dustbin blown by the wind can also be a traffic-relevant object.

As part of the process, an observation $o_{\tau 0}$ of the object's surroundings at a time $\tau_0$ is mapped by a trained encoder network to a representation $z_{\tau 0}$ with reduced dimensionality. This time $\tau_0$ can also represent a time interval and, for example, be a reference point of this time interval, such as the beginning, middle or end. This observation can be recorded, for example, with a sensor carried by the object, but also, for example, with another sensor in whose detection range the object is located. It is only important that a movement of the object affects the future observations.

Observations o can comprise, for example, images of the object's surroundings. These images can comprise, for example, camera images, video images, radar images, lidar images, thermal images and/or ultrasound images.

By means of an action $a_{\tau 0}$ performed by the object at the time $\tau_0$ and the representation $z_{\tau 0}$, using at least one trained prediction network a prediction $\hat{z}_{\tau 1}$ of the representation $z_{\tau 1}$ to which a future observation $o_{\tau 1}$ is likely to be mapped by the trained encoder network at the time $\tau_1 > \tau_0$, and/or a prediction $\hat{a}_{\tau 1}$ of an action $a_{\tau 1}$ which the object is likely to perform at the time $\tau_1$ is determined. Such an action a can comprise, for example, an acceleration, a deceleration, a rotation and/or a steering movement of the object.

The prediction $\hat{z}_{\tau 1}$ and/or $\hat{a}_{\tau 1}$ is used to determine a prediction $\hat{d}_{\tau 1}$ for the dynamic state $d_{\tau 1}$ of the object at the time $\tau_1$. In particular, this dynamic state $d_{\tau 1}$ can comprise, for example, the position $x_{\tau 1}$, of the object at time $\tau_1$, and/or the speed $v_{\tau 1}$, of the object at time $\tau_1$, and/or the orientation $\theta_{\tau 1}$ of the object at time $\tau_1$. Accordingly, the prediction $\hat{d}_{\tau 1}$, can, in particular, comprise predictions $\hat{x}_{\tau 1}$, $\hat{v}_{\tau 1}$ and/or $\hat{\theta}_{\tau 1}$, for example. Alternatively or in combination with this, the dynamic state $d_{\tau 1}$ can also comprise longitudinal and lateral velocity and acceleration or path curvature. All these variables can be relevant for downstream components and can therefore be derived from the current state $d_{\tau 0}$ and the action $a_{\tau 1}$ (or prediction $a_{\tau 1}$) using a model. This information can be used, for example, to update a forecast for the trajectory of the object.

It was recognized that determining a prediction based on a representation $z_{\tau 0}$ improves the accuracy of the prediction and also makes this prediction robust against disturbances in the observations, such as noise. For example, if the encoder network is trained in tandem with a decoder network so that an observation o processed by the encoder network into a representation z is reconstructed as well as possible after processing this representation z by the decoder network, the information from the observation o is squeezed through the "bottleneck" of the significantly lower dimensionality of the representation z. The encoder network is therefore forced to make a selection as to which information from the observation o is particularly important in relation to the respective application. For example, noise is not part of the information that is absolutely necessary for the reconstruction of the original observation o and is therefore suppressed in the representation.

Furthermore, the division of the overall task into the determination of the predictions $\hat{z}_{\tau 1}$ and/or $\hat{a}_{\tau 1}$ on the one hand and into the further processing for the prediction $\hat{x}_{\tau 1}$, $\hat{v}_{\tau 1}$ or $\hat{\theta}_{\tau 1}$ for the position $x_{\tau 1}$, the speed $v_{\tau 1}$ or the orientation $\theta_{\tau 1}$ of the object at the time $\tau_1$ on the other hand makes it possible to outsource the aspects of the kinematics of the object that can be explained by a model to the latter further processing. When training the encoder network and the prediction network(s), only those aspects of the kinematics that cannot already be explained by other means then play a role. In this way, the accuracy of the overall obtained predictions $\hat{x}_{\tau 1}$, $\hat{v}_{\tau 1}$ or $\hat{\theta}_{\tau 1}$ is improved, and the determination of these predictions is also made more robust.

For example, in a particularly advantageous embodiment, the prediction $\hat{d}_{\tau 1}$ for the dynamic state $d_{\tau 1}$ of the object, such as the prediction $\hat{d}_{\tau 1}$, and/or the prediction $\hat{v}_{\tau 1}$, and/or the prediction $\hat{\theta}_{\tau 1}$, can be determined from the prediction $\hat{z}_{\tau 1}$ and/or $\hat{a}_{\tau 1}$ using a predetermined kinematic model of the object. In this way, any existing prior knowledge about the respective object can be used. For example, vehicles have certain minimum turning circles that limit rapid changes of direction.

The situation is somewhat analogous to the two ways in which a 3D model of a given object can be obtained for its production with a 3D printer. The first way is to obtain a design description of the object by measuring certain shapes on the object and to manufacture the object on the basis of this design description. This promises good manufacturing accuracy and requires comparatively little computing time. The second way is to photograph a geometry of the object, for which no construction description is available, and to reconstruct the geometry using photogrammetry. This requires a lot of computing time and promises less precise production than production according to a design description, but works universally with any object. As part of the production task, it is now advantageous to produce those parts of the object for which there is a design description using this design description and only supplement the missing parts with photogrammetry.

In a further advantageous embodiment, a first prediction network is used to determine the prediction $\hat{z}_{\tau 1}$, and a second prediction network is used to determine the prediction $\hat{z}_{\tau 1}$ from the prediction $\hat{a}_{\tau 1}$. The development from time $\tau_0$ to time $\tau_1$ then takes place entirely in the space of lower-dimensional representations z. Only then is the result translated into an action a. In this way, each of the prediction networks can specialize in its task, which further improves the accuracy of the prediction $\hat{a}_{\tau 1}$ ultimately obtained.

In the interest of further improving accuracy, the second prediction network can optionally also use the action $a_{\tau 0}$ and/or the representation $z_{\tau 0}$ to determine the prediction $\hat{a}_{\tau 1}$.

In a further advantageous embodiment
a prediction $\hat{z}_{\tau 2}$ of the representation $\hat{z}_{\tau 2}$ to which a future observation $o_{\tau 2}$ is likely to be mapped by the trained encoder network at the time $\tau_2 > \tau_1$, and/or
a prediction $\hat{a}_{\tau 2}$ of an action $a_{\tau 2}$ which the object is likely to perform at the time $\tau_2$
are determined with the prediction network(s) from the predictions $\hat{z}_{\tau 1}$ and $\hat{a}_{\tau 1}$. In this way, a forecast can be divided into many individual forecasts over a forecast period of any length. This significantly simplifies forecasting over the long term. This is somewhat comparable to the fact that it is easier to jump 1 m up onto a step and from there 1 m up onto another step than to jump 2 m up to the second step in a single jump.

As explained above, in at least partially automated driving, the predictions $\hat{d}_{\tau 1}$ for the dynamic state $d_{\tau 1}$, $\hat{x}_{\tau 1}$ for the position $x_{\tau 1}$, $\hat{v}_{\tau 1}$ for the speed $v_{\tau 1}$ and/or $\hat{\theta}_{\tau 1}$ for the orientation $\theta_{\tau 1}$ of the object at the time $\tau_1$ can be used in particular to check whether the trajectory of the object possibly intersects the trajectory of a vehicle to be guided.

Therefore, in a particularly advantageous embodiment, a control signal for a vehicle is determined from at least one prediction $\hat{d}_{\tau 1}$, and/or $\hat{x}_{\tau 1}$, and/or $\hat{v}_{\tau 1}$, and/or $\hat{\theta}_{\tau 1}$. This vehicle is controlled with the control signal. In this way, in situations in which a collision between the vehicle and the object is imminent, this collision can be avoided with a higher probability, for example by braking the vehicle and/or diverting it onto an evasive course. At the same time, in situations where there is no objective threat of a collision, there is a lower probability of an evasive or braking maneuver being carried out. Such unprovoked maneuvers could greatly irritate the occupants of an automated vehicle, for example, and would also come as a complete surprise to a human driver of a following vehicle. This driver could therefore possibly react too late and rear-end the vehicle.

The disclosure also provides a method for training an arrangement comprising an encoder network and one or more prediction networks for use in the method described above.

As part of this process, an encoder network and one or more prediction networks are provided. Furthermore, a time series of observations o of the surroundings of the object whose movement is to be predicted is provided. The observations o are mapped to representations z using the trained encoder network.

Using at least one representation $z_{\tau 0}$, which relates to an observation $o_{\tau 0}$ of the surroundings of the object at a time $\tau_0$, predictions $\hat{z}_{\tau 1}$ and $\hat{a}_{\tau 1}$ are determined using the previously described method. Parameters that characterize the behavior of the prediction network(s) are optimized to ensure that the prediction $\hat{z}_{\tau 1}$ corresponds as well as possible to a representation $z_{\tau 1}$ to which the encoder network maps an observation $o_{\tau 1}$ at the time $\tau_1 > \tau_0$ obtained from the time series; and/or the prediction $\hat{a}_{\tau 1}$ corresponds as closely as possible to an action $a_{\tau 1}$ actually performed by the object at the time $\tau_1$.

In this way, the prediction network(s) can be "self-monitored". This means that the training only has to draw on information that results from the observation of the object itself. It is not necessary to "label" these observations with target predictions.

Both optimization targets can, for example, each contribute a term to a cost function L ("loss function") for the optimization:

$$L = \|\hat{z}_{\tau 1} - z_{\tau 1}\| + \|\hat{a}_{\tau 1} - a_{\tau 1}\|.$$

However, the action $a_{\tau 1}$ performed by the object at the time $\tau_1$ does not necessarily have to be derived from the observation of the object itself. If a target action $a_{\tau 1}^*$ is available that the object should perform at the time $\tau_1$, this can be used instead of $a_{\tau 1}$.

The aspect of self-monitoring can be further strengthened in another advantageous embodiment. In this configuration, representations $z_{\tau 1}$ and $z_{\tau 0}$ a reconstruction $\hat{a}_{\tau 0}$ of the action $a_{\tau 0}$ performed by the object at an earlier time $\tau_0$ are also determined. The parameters that characterize the behavior of the prediction network(s) are then additionally optimized to ensure that the reconstruction $\hat{a}_{\tau 0}$ matches the action $a_{\tau 0}$ as closely as possible. For example, the above loss function can be extended for this purpose:

$$L = \|\hat{z}_{\tau 1} - z_{\tau 1}\| + \|\hat{a}_{\tau 1} - a_{\tau 1}\| + \|\hat{a}_{\tau 0} - a_{\tau 0}\|.$$

In particular, the reconstruction $\hat{a}_{\tau 0}$ can be determined using a trainable reconstruction network, for example. The parameters that characterize this reconstruction network can also be optimized to ensure that the reconstruction $\hat{a}_{\tau 0}$ matches the action $a_{\tau 0}$ as closely as possible. The reconstruction $\hat{a}_{\tau 0}$ is, so to speak, a "prediction" of the past on the basis of the observations accumulated up to the present o.

If the predictions $\hat{d}_{\tau 1}$, $\hat{x}_{\tau 1}$, $\hat{v}_{\tau 1}$ or $\hat{\theta}_{\tau 1}$ associated target predictions ("ground truth") $d_{\tau 1}^*$, $x_{\tau 1}^*$, $v_{\tau 1}^*$ or $\theta_{\tau 1}^*$ or are available, a deviation $\|\hat{d}_{\tau 1} - d_{\tau 1}^*\|$, $\|\hat{x}_{\tau 1} - x_{\tau 1}^*\|$, $\|\hat{v}_{\tau 1} - v_{\tau 1}^*\|$ or $\|\hat{\theta}_{\tau 1} - \theta_{\tau 1}^*\|$ can also be included in the loss function L. This means that the parameters that characterize the behavior of the prediction network(s) are additionally optimized with the aim of minimizing the respective deviations from the target predictions $x_{\tau1}^*$, $v_{\tau1}^*$ or $\theta_{\tau1}^*$. The target predictions $x_{\tau1}^*$, $v_{\tau1}^*$ or $\theta_{\tau1}^*$ can be obtained by measurement, for example. The deviation can be determined using the Huber distance, for example, $$\|\hat{x}_{\tau1} - x_{\tau1}^*\| =: \|\Delta x_{\tau1}\| = \begin{cases} \frac{1}{2}\Delta x_{\tau1}^2, & |\Delta x_{\tau1}| < h \\ h(|\Delta x_{\tau1}|) - \frac{1}{2}h & \text{otherwise} \end{cases}$$

which cuts off at h=1.0. The Huber distance contains predicted positions $\hat{x}_{\tau1}$ that were determined with the fully differentiable kinematic model. Therefore, the loss function is differentiable at least with respect to this Huber distance, so that gradients can be formed and back-propagated by the prediction network(s). The Huber distance is just one example. Alternatively or in combination with this, any other standards for the deviation, such as an L1 loss or an L2 loss, can be used.

The encoder network can be obtained in a fully trained state. However, it can also be trained or re-trained as part of the training procedure. In particular, this training can be aimed at the same goals as the training of the prediction networks. For example, the encoder network can be trained together with the prediction networks. Thus, in a particularly advantageous embodiment, parameters that characterize the behavior of the encoder network are also optimized together with the parameters that characterize the behavior of the prediction network.

However, the encoder network can also be trained in an encoder-decoder arrangement with a decoder network, for example. For this purpose, in a further advantageous embodiment, an encoder network to be trained and a decoder network to be trained are provided, wherein the decoder network is designed to map representations z to observations o. Training observations o # are processed into representations z # with the encoder network.

Observations o ## are reconstructed from the representations z # using the decoder network. Parameters that characterize the behavior of the encoder network and the decoder network are optimized to ensure that the reconstructed observations o # match the training observations o # as closely as possible.

The method can in particular be fully or partly computer-implemented. Therefore, the disclosure also relates to a computer program comprising machine-readable instructions which, when executed on one or more computers, cause the computer or computers to perform the described method of training the neural network. In this sense, control units for vehicles and embedded systems for technical devices that are likewise capable of executing machine-readable instructions are also to be regarded as computers.

The disclosure furthermore also relates to a machine-readable data carrier and/or to a download product comprising said computer program. A download product is a digital product that can be transmitted via a data network, i.e. can be downloaded by a user of the data network, and can be offered for sale in an online shop for immediate download, for example.

A computer can moreover be equipped with the computer program, with the machine-readable data carrier or with the download product.

Further measures improving the disclosure are shown in more detail below, together with the description of the preferred exemplary embodiments of the disclosure, with reference to the figures.

DETAILED DESCRIPTION

Figure 1:
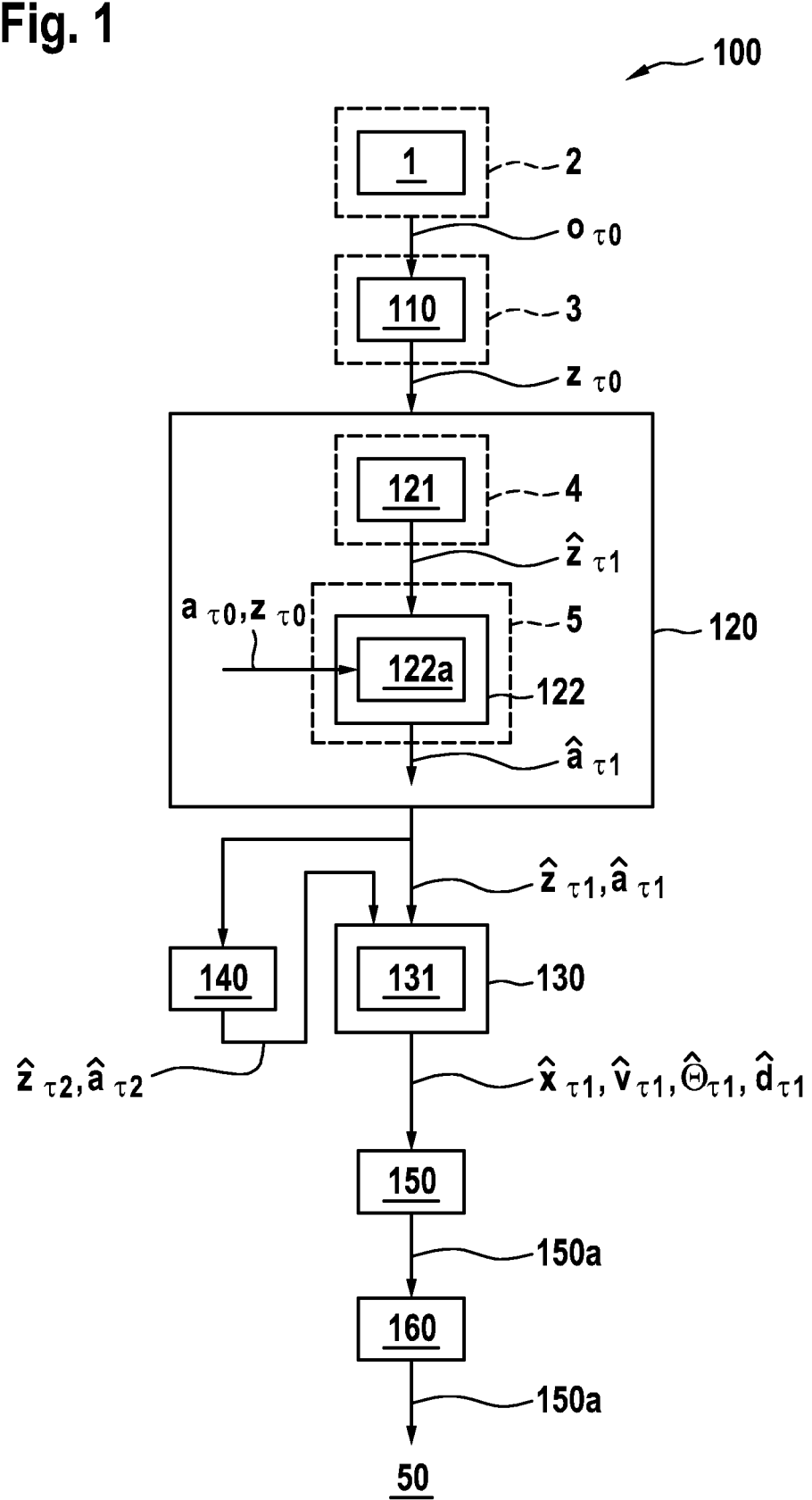
FIG. 1 Exemplary embodiment of the method 100 for predicting the movement of a traffic-related object 1.

FIG. 1 is a schematic flow chart of an exemplary embodiment of the method 100 for predicting the movement of a traffic-related object 1.

In step 110, an observation $o_{\tau0}$ of the surroundings 2 of the object 1 at a time $\tau_0$ is mapped from a trained encoder network 3 to a representation $z_{\tau0}$ with reduced dimensionality.

In step 120, based on an action $a_{\tau0}$ performed by the object 1 at the time $\tau_0$ and the representation $z_{\tau0}$ with at least one trained prediction network 4, 5 a prediction $\hat{z}_{\tau1}$ of the representation $z_{\tau1}$ to which a future observation $o_{\tau1}$ is likely to be mapped at time $\tau_1 > \tau_0$ by the trained encoder network 3, and/or a prediction $\hat{a}_{\tau1}$ of an action $a_{\tau1}$ that the object (1) is likely to perform at the time $\tau_1$, is determined.

Here, the prediction $\hat{z}_{\tau1}$ can be determined from the prediction according to block 121 with a first prediction network 3 and the prediction $\hat{a}_{\tau1}$ can be determined from the prediction $\hat{z}_{\tau1}$ according to block 122 with a second prediction network 4. According to block 122a, the second prediction network may additionally utilize the action $a_{\tau0}$ and/or the representation $z_{\tau0}$ to determine the prediction $\hat{a}_{\tau1}$.

In step 130, the prediction $\hat{z}_{\tau1}$ and/or $\hat{a}_{\tau1}$ is used to determine a prediction $\hat{d}_{\tau1}$ for the dynamic state $d_{\tau1}$ of the object 1 at the time $\tau_1$. In particular, this prediction $\hat{d}_{\tau1}$ can comprise, for example, a prediction $\hat{x}_{\tau1}$ for the position $x_{\tau1}$ of the object 1 at time $\tau_1$, and/or a prediction $\hat{v}_{\tau1}$ for the speed $v_{\tau1}$ of the object 1 at time $\tau_1$, and/or a prediction $\hat{\theta}_1$ for the orientation $\theta_{\tau1}$ of the object 1 at time $\tau_1$. According to block 131, these predictions can be determined from the prediction $\hat{z}_{\tau1}$ and/or $\hat{a}_{\tau1}$ using a predetermined kinematic model of the object 1.

In step 140, a prediction $\hat{z}_{\tau2}$ of the representation $z_{\tau2}$ to which a future observation $o_{\tau2}$ is likely to be mapped by the trained encoder network at the time $\tau_2 > \tau_1$ and/or a prediction $\hat{a}_{\tau2}$ of an action $a_{\tau2}$ which the object 1 is likely to perform at the time $\tau_2$ can also be determined from the predictions. These predictions $\hat{z}_{\tau2}$ and/or $\hat{a}_{\tau2}$ can also be used in step 130 to determine the predictions $\hat{d}_{\tau1}$, $\hat{x}_{\tau1}$, $\hat{v}_{\tau1}$ and/or $\hat{\theta}_{\tau1}$.

In step 150, a control signal 150a for a vehicle 50 is determined from at least one prediction $\hat{d}_{\tau1}$, $\hat{x}_{\tau1}$ and/or $\hat{v}_{\tau1}$, and/or $\hat{\theta}_{\tau1}$. In step 160, this vehicle 50 is controlled with the control signal 150a.

Figure 2:
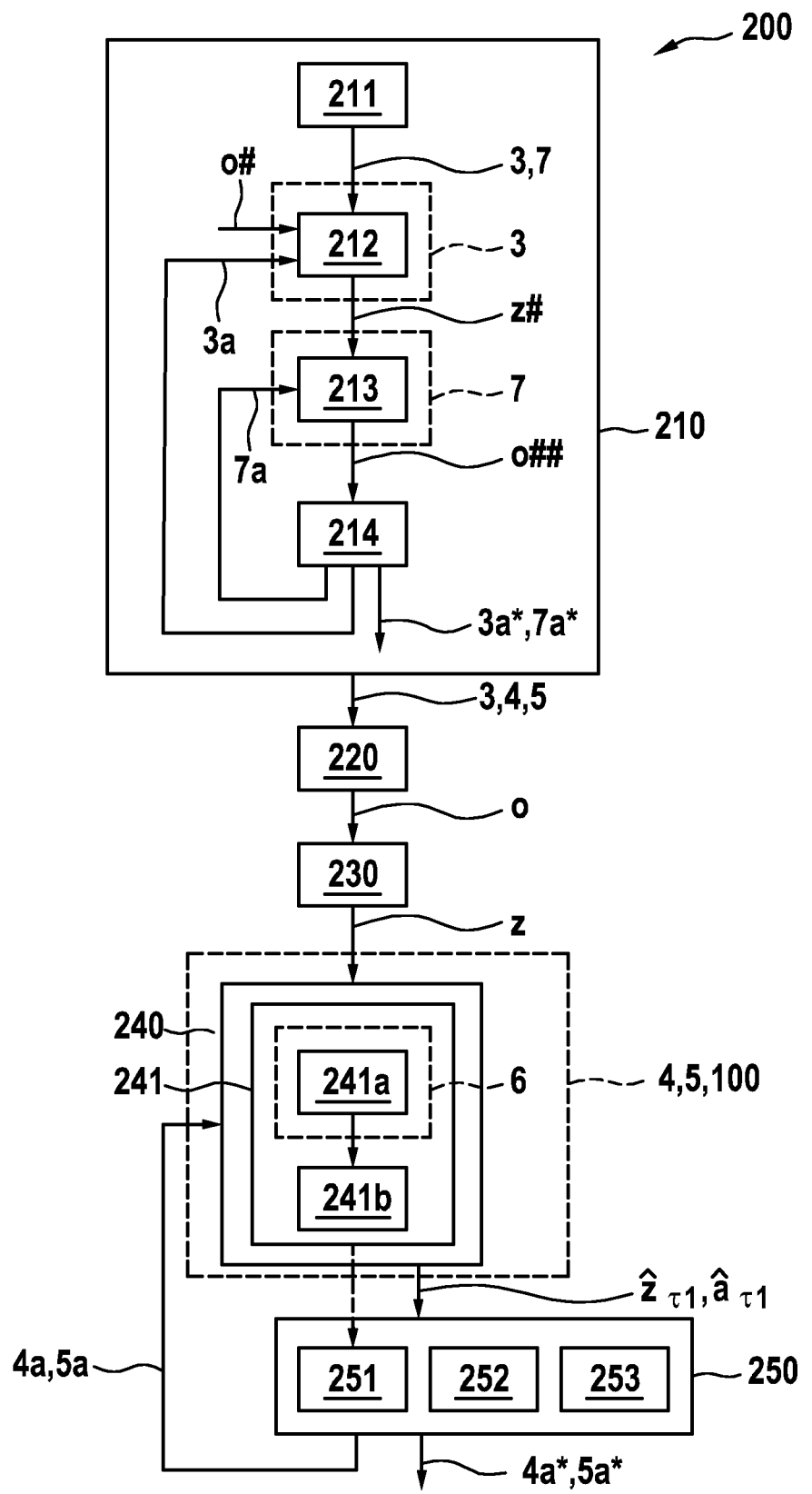
FIG. 2 Exemplary embodiment of the method 200 for training the arrangement of encoder network 3 and prediction networks 4, 5.

FIG. 2 is a schematic flowchart of an exemplary embodiment of the method 200 for training the arrangement of encoder network 3 and prediction networks 4, 5.

In step 210, an encoder network 3 and one or more prediction networks 4, 5 to be trained are provided.

Within the box 210, an example of how the encoder network 3 can be procured in a trained or at least pre-trained state is shown in detail.

According to block 211, an encoder network 3 to be trained and a decoder network 7 to be trained can be provided. The decoder network 7 is designed to map representations z to observations o.

Training observations o # can be processed into representations z # according to block 212 with the encoder network 3. These representations z # can then be used to reconstruct observations o ## according to block 213.

According to block 214, parameters 3a, 7a, which characterize the behavior of the encoder network 3 and the decoder network 7, can be optimized with the aim that the reconstructed observations o ## match the training observations o # as well as possible.

In step 220, a time series of observations o of the surroundings 2 of the object 1 is provided.

In step 230, the observations o are mapped to representations z using the trained encoder network 3.

In step 240, predictions $\hat{z}_{\tau 1}$ and $\hat{a}_{\tau 1}$ are determined based on at least one representation $z_{\tau 0}$, which refers to an observation $o_{\tau 0}$ of the surroundings 2 of the object 1 at a time $\tau_0$, using the method 100 described above.

In step 250, parameters 4a, 5a that characterize the behavior of the prediction network(s) 4, 5 are optimized with the aim that
  the prediction $\hat{z}_{\tau 1}$ matches as well as possible with a representation $z_{\tau 1}$ to which the encoder network 3 maps an observation $o_{\tau 1}$ at time $\tau_1 > \tau_0$ obtained from the time series; and/or
  the prediction $\hat{a}_{\tau 1}$ corresponds as closely as possible to an action $a_{\tau 1}$ actually performed by object 1 at the time $\tau_1$.

The fully trained state of the parameters 4a, 5a is indicated by the reference signs 4a*, 5a*.

According to block 241, representations $z_{\tau 1}$ and $z_{\tau 0}$ a reconstruction $\hat{a}_{\tau 0}$ of the action $a_{\tau 0}$ performed by the object 1 at the earlier time $\tau_0$ can be determined. The parameters 4a, 5a, which characterize the behaviour of the prediction network(s) 4, 5, can then be additionally optimized according to block 251 with the aim of ensuring that the reconstruction $\hat{a}_{\tau 0}$ matches the action $a_{\tau 0}$ as closely as possible.

In particular, the reconstruction can be determined with a trainable reconstruction $\hat{a}_{\tau 0}$ network 6, for example according to block 241a. The parameters that characterize the behavior of the reconstruction network 6 can then also be optimized according to block 241b to ensure that the reconstruction $\hat{a}_{\tau 0}$ matches the action $a_{\tau 0}$ as closely as possible.

According to block 252, furthermore, the parameters characterizing the behavior of the prediction network(s) 4, 5 may additionally be optimized with the aim that deviations $\|\hat{d}_{\tau 1} - d_{\tau 1}*\|$, $\|\hat{x}_{\tau 1} - x_{\tau 1}*\|$, $\|\hat{v}_{\tau 1} - v_{\tau 1}*\|$ or $\|\hat{\theta}_{\tau 1} - \theta_{\tau 1}*\|$ from the predictions $\hat{d}_{\tau 1}$, $\hat{x}_{\tau 1}$, $\hat{v}_{\tau 1}$ or $\hat{\theta}_{\tau 1}$ from associated target predictions $d_{\tau 1}*$, $x_{\tau 1}*$, $v_{\tau 1}*$, or $\theta_{\tau 1}*$ are minimized. The target predictions can be obtained, for example, from measurements of the variables $d_{\tau 1}$, $x_{\tau 1}$, $v_{\tau 1}$ or $\theta_{\tau 1}$.

According to block 253, together with the parameters 4a, 5a, which characterize the behavior of the prediction networks 4, 5, parameters 3a, which characterize the behavior of the encoder network 3, can also be optimized.

The invention claimed is:

1. A method for predicting a movement of at least one traffic-relevant object based on observations of a surroundings of the object, the method comprising:
  mapping an observation of the surroundings at a time by a trained encoder network to a first representation with reduced dimensionality;
  based on a first action performed by the object at the time and the first representation, using at least one prediction network to:
    determine a first representation prediction of a second representation to which a first future observation at a first future time is expected to be mapped by the trained encoder network, and/or
    determine a first action prediction of a second action that the object is likely to perform at the first future time; and
  determine a first dynamic state prediction for a dynamic state of the object at the first future time based on the first representation prediction and/or the first action prediction.

2. The method according to claim 1, wherein the dynamic state of the object comprises a position of the object at the first future time, a velocity of the object at the first future time, and/or an orientation of the object at the first future time.

3. The method according to claim 1, wherein:
  the first representation prediction is determined using a first prediction network, and
  the first action prediction is determined from the first representation prediction using a second prediction network.

4. The method according to claim 3, wherein the second prediction network additionally utilizes the first action and/or the first representation to determine the first action prediction.

5. The method according to claim 4, wherein based on the first representation predication and the first action prediction the first prediction network and the second prediction network are configured to determine:
  a second representation prediction of a third representation to which a second future observation is likely to be mapped at a second future time by the trained encoder network, and/or
  a second action prediction of a third action that the object is likely to perform at the second future time.

6. The method according to claim 1, wherein the first dynamic state prediction, a first position prediction, a first speed prediction, and/or a first orientation prediction, is determined from the first representation prediction and/or the first action prediction using a predetermined kinematic model of the object.

7. The method according to claim 6, further comprising:
  determining a control signal for a vehicle from at least one of the first dynamic state prediction, the first position prediction, the first speed prediction, and/or the first orientation prediction, and
  the vehicle is controlled with the determined control signal.

8. A method for training an arrangement of an encoder network and one or more prediction networks for use in the method according to claim 1, comprising:
  providing an encoder network and one or more prediction networks;
  providing a time series of a plurality of observations of the surroundings of the object;
  mapping the plurality of observations to a plurality of representations using the trained encoder network;
  using at least one representation of the plurality of representations relating to one of the observations of the plurality of observations of the surroundings of the object at a time;
  determining the first representation prediction and the first action prediction according to the method; and optimizing parameters that characterize a behavior of the one or more prediction networks such that
the first representation prediction corresponds to the second representation to which the encoder network maps an observation obtained from the time series of the plurality of observations at the first future time; and/or
the first action prediction corresponds to the second action actually performed by the object at the first future time.

9. The method according to claim 8, further comprising:
determining a reconstruction of the first action performed by the object at the first time from the first and second representations, and
additionally optimizing the parameters that characterize the behavior of the first and second prediction networks such that the first reconstruction matches the first action.

10. The method according to claim 9, further comprising:
determining the first reconstruction using a trainable reconstruction network, and
optimizing the parameters characterizing the behavior of the reconstruction network to a goal that the first reconstruction matches the first action.

11. The method according to claim 8, wherein the parameters characterizing the behavior of the first and second prediction networks are additionally optimized towards a goal that $\|\hat{d}_{\tau 1}-d_{\tau 1}^*\|$, $\|\hat{x}_{\tau 1}-x_{\tau 1}^*\|$, $\|\hat{v}_{\tau 1}-v_{\tau 1}^*\|$ or $\|\hat{\theta}_{\tau 1}-\theta_{\tau 1}^*\|$ of the predictions $\hat{d}_{\tau 1}$, $\hat{x}_{\tau 1}$, $\hat{v}_{\tau 1}$ or $\hat{\theta}_{\tau 1}$ of associated target predictions $d_{\tau 1}^*$, $x_{\tau 1}^*$ $v_{\tau 1}^*$, or $\theta_{\tau 1}^*$ are minimized.

12. The method according to claim 8, further comprising:
together with the parameters characterizing the behavior of the prediction networks, parameters characterizing a behavior of the encoder network are also optimized.

13. The method according to claim 8, wherein providing the encoder network comprises:
mapping the encoder network to be trained and a decoder network to be trained, wherein the decoder network is configured to map the representations onto the observations;
processing training observations with the encoder network to the representations
reconstructing the observations from the representations with the decoder network; and
optimizing the reconstructed observations by matching the parameters, which characterize the behavior of the encoder network and the decoder network, with the training observations.

14. The method according to claim 1, wherein the observations comprise images of the surroundings of the object.

15. The method according to claim 1, wherein the actions comprise accelerations, decelerations, rotations and/or steering movements of the object.

16. The method according to claim 1, wherein a computer program contains machine-readable instructions which, when executed on one or more computers, cause the computer or computers to carry out the method.

17. The method according to claim 16, wherein a non-transitory machine-readable storage medium and/or download product comprises the computer program.

18. The method according to claim 17, wherein at least one computer includes the computer program and/or the non-transitory machine-readable storage medium and/or download product.

* * * * *